US012260824B2

(12) United States Patent
Zhang et al.

(10) Patent No.: US 12,260,824 B2
(45) Date of Patent: Mar. 25, 2025

(54) PIXEL DRIVING CIRCUIT AND DISPLAY PANEL

(71) Applicant: WUHAN CHINA STAR OPTOELECTRONICS SEMICONDUCTOR DISPLAY TECHNOLOGY CO., LTD., Wuhan (CN)

(72) Inventors: Huanxi Zhang, Wuhan (CN); Zhilin Yang, Wuhan (CN); Shuyuan Zhang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/383,545

(22) Filed: Oct. 25, 2023

(65) Prior Publication Data

US 2024/0331640 A1 Oct. 3, 2024

(30) Foreign Application Priority Data

Mar. 31, 2023 (CN) ........................ 202310340635.5

(51) Int. Cl.
*G09G 3/3258* (2016.01)
*G09G 3/32* (2016.01)
*G09G 3/3266* (2016.01)
*G09G 3/3291* (2016.01)

(52) U.S. Cl.
CPC ............ *G09G 3/3258* (2013.01); *G09G 3/32* (2013.01); *G09G 3/3266* (2013.01); *G09G 3/3291* (2013.01); *G09G 2310/0267* (2013.01); *G09G 2310/0275* (2013.01); *G09G 2310/08* (2013.01)

(58) Field of Classification Search
CPC ...... G09G 3/3258; G09G 3/32; G09G 3/3266; G09G 3/3291; G09G 2310/0267; G09G 2310/0275; G09G 2310/08
USPC ...................................................... 345/76–89
See application file for complete search history.

(56) References Cited

U.S. PATENT DOCUMENTS

| | | | | |
|---|---|---|---|---|
| 11,074,864 B1 * | 7/2021 | Lu | .......................... | G09G 3/325 |
| 2017/0098413 A1 * | 4/2017 | Lee | ...................... | G09G 3/3233 |
| 2018/0144685 A1 * | 5/2018 | Gong | ................. | H10K 59/1213 |
| 2019/0058029 A1 * | 2/2019 | Woo | .................. | H01L 29/41733 |
| 2023/0031984 A1 * | 2/2023 | Wang | .................. | G09G 3/3233 |
| 2023/0343294 A1 * | 10/2023 | Guo | ..................... | G09G 3/3233 |
| 2024/0062721 A1 * | 2/2024 | Liu | ...................... | G09G 3/3225 |

* cited by examiner

*Primary Examiner* — Kwin Xie
(74) *Attorney, Agent, or Firm* — The Roy Gross Law Firm, LLC; Roy Gross

(57) ABSTRACT

The present application provides a pixel driving circuit and a display panel. The pixel driving circuit includes a driving transistor and a data writing module. a driving timing of the pixel driving circuit includes a writing frame including a first data writing phase and a second data writing phase in sequence, the data voltage includes an active data voltage and a first data compensation voltage, the data writing module is configured to write the first data compensation voltage into the gate, the first electrode, and the second electrode of the driving transistor in the first data writing phase, and to write the active data voltage into the gate, the first electrode, and the second electrode of the driving transistor in the second data writing phase.

19 Claims, 3 Drawing Sheets

PIXEL DRIVING CIRCUIT AND DISPLAY PANEL

CROSS-REFERENCE TO RELATED APPLICATION

This application claims priority to and the benefit of Chinese Patent Application No. 202310340635.5, filed on Mar. 31, 2023, the entire content of which is hereby incorporated by reference.

TECHNICAL FIELD

The present application relates to the field of display technologies, and more particularly to a pixel driving circuit and a display panel.

BACKGROUND

Low Temperature Polycrystalline Oxide (LTPO) products are increasingly used in the high-end product market from current market applications. For Wide Quad High-Definition (WQHD) LTPO products in combination with micro prism technology, their low power consumption and low frequency are increasingly important indicators for evaluating the taste of the product. However, when the display frequency of the LTPO product is switched from a high frequency to a low frequency (e.g., 120 Hz→1 Hz), there is a problem in that change in both the brightness and the color occurs after switching of the frequency.

SUMMARY

In a first aspect, an embodiment of the present application provides a pixel driving circuit, including a driving transistor and a data writing module; where a first control terminal of the data writing module is connected to a first control signal, a second control terminal of the data writing module is connected to a second control signal, an input terminal of the data writing module is connected to a data voltage, and the data writing module is further electrically connected to a gate, a first electrode and a second electrode of the driving transistor; a driving timing of the pixel driving circuit includes a writing frame including a first data writing phase and a second data writing phase in sequence, the data voltage includes an active data voltage and a first data compensation voltage, the data writing module is configured to write the first data compensation voltage into the gate, the first electrode, and the second electrode of the driving transistor in the first data writing phase, and to write the active data voltage into the gate, the first electrode, and the second electrode of the driving transistor in the second data writing phase.

Optionally, in some embodiments of the present application, the driving timing of the pixel driving circuit further includes a third data writing phase after the second data writing phase, and the data voltage further includes a second data compensation voltage; and the data writing module is configured to write the second data compensation voltage into the first electrode and the second electrode of the driving transistor in the third data writing phase.

Optionally, in some embodiments of the present application, in the writing frame, the first control signal includes three first pulses and the second control signal includes two second pulses; and in the driving timing of the pixel driving circuit, first one of the first pulses and first one of the second pulses are located in the first data writing phase and at least partially overlapped with each other, second one of the first pulses and second one of the second pulses are located in the second data writing phase and at least partially overlapped with each other, and third one of the first pulses is located in the third data writing phase.

Optionally, in some embodiments of the present application, the pixel driving circuit further includes a first initialization module, where a control terminal of the first initialization module is connected to a third control signal, an input terminal of the first initialization module is connected to a first initialization signal, and an output terminal of the first initialization module is electrically connected to the gate of the driving transistor; and the driving timing of the pixel driving circuit includes a first initialization phase, the first data writing phase, a second initialization phase, and the second data writing phase in sequence, and the first initialization module is configured to write the first initialization signal into the gate of the driving transistor in the first initialization phase and the second initialization phase respectively.

Optionally, in some embodiments of the present application, the first initialization module is further configured to write the first initialization signal into the second electrode of the driving transistor in the first initialization phase and/or the second initialization phase.

Optionally, in some embodiments of the present application, the first control signal includes a first pulse, the second control signal includes a second pulse, and the third control signal includes a third pulse, and in the first initialization phase and/or the second initialization phase, the first pulse at least partially overlaps the second pulse, and the third pulse is interleaved with the first pulse.

Optionally, in some embodiments of the present application, the second control signal and the third control signal are generated by the same gate driver on array (GOA) circuit, the second control signal is an nth stage of scan signal output by the GOA circuit, and the third control signal is an (n-5)-th stage of scan signal output by the GOA circuit.

Optionally, in some embodiments of the present application, the driving timing of the pixel driving circuit further includes a holding frame located after the writing frame, where the data writing module is further configured to write the data voltage into the first electrode and the second electrode of the driving transistor at least once in the holding frame.

In a second aspect, another embodiment of the present application further provides a display panel, including a plurality of pixel units arranged in an array, where each of the pixel units includes any of the pixel driving circuits described above.

Optionally, in some embodiments of the present application, the first data compensation voltage in the pixel driving circuit corresponding to the mth row of pixel units is the active data voltage in the pixel driving circuit corresponding to the kth row of pixel units, where m and k are both positive integers, and m is greater than k.

BRIEF DESCRIPTION OF THE DRAWINGS

In order to more clearly illustrate the technical solutions in embodiments of the present application, the accompanying drawings depicted in the description of the embodiments will be briefly described below. It will be apparent that the accompanying drawings in the following description are merely some embodiments of the present application, and other drawings may be obtained from these drawings without creative effort by those skilled in the art.

DETAILED DESCRIPTION

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In the description of the present application, it should be understood that the term "first", "second" are for illustrative purposes only and are not to be construed as indicating or imposing a relative importance or implicitly indicating the number of technical features indicated. Thus, a feature that limited by "first" and "second" may expressly or implicitly include at least one of the features, and therefore cannot be construed as a limitation on the present application. Additionally, it should be noted that the terms "connected to" and "connection" should be understood in a broad sense, unless otherwise clearly specified and defined. For example, it can be a mechanical connection, or an electrical connection; it can be directly connected or indirectly connected through an intermediary, it can also be the connection between two elements. Those ordinary skilled in the art can understand the specific meanings of the above terms in the present application according to specific situations.

The embodiments of the present application provide a pixel driving circuit and a display device, which are illustrated in detail below. It should be noted that the description order of the following embodiments of the present application is not intended to limit the preferred order of the embodiments.

Figure 1:
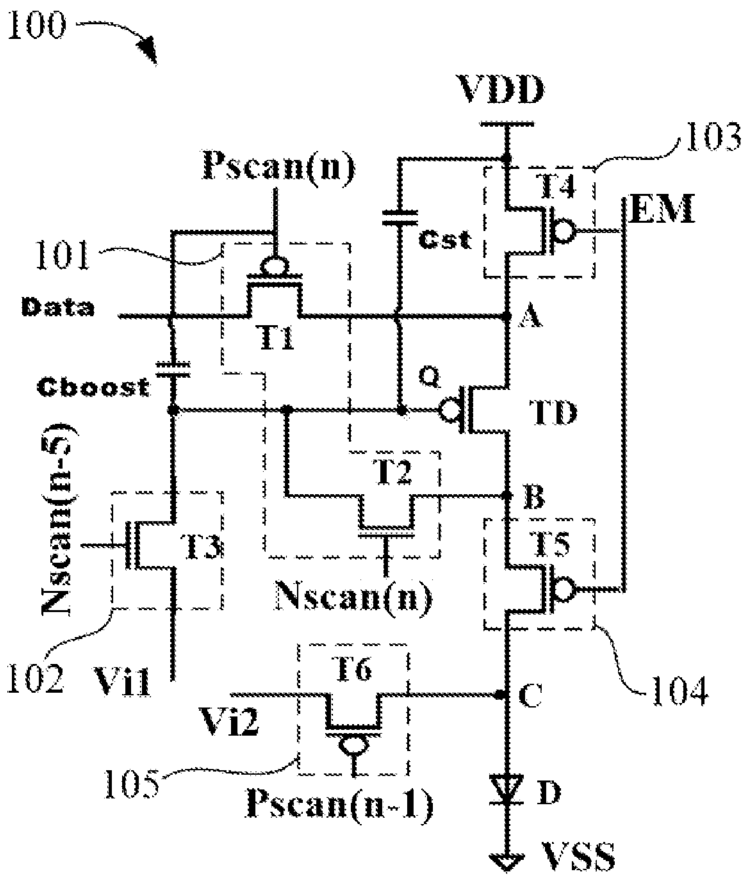
FIG. 1 is a schematic diagram showing a circuit structure of a pixel driving circuit according to some embodiments of the present application.
Figure 2:
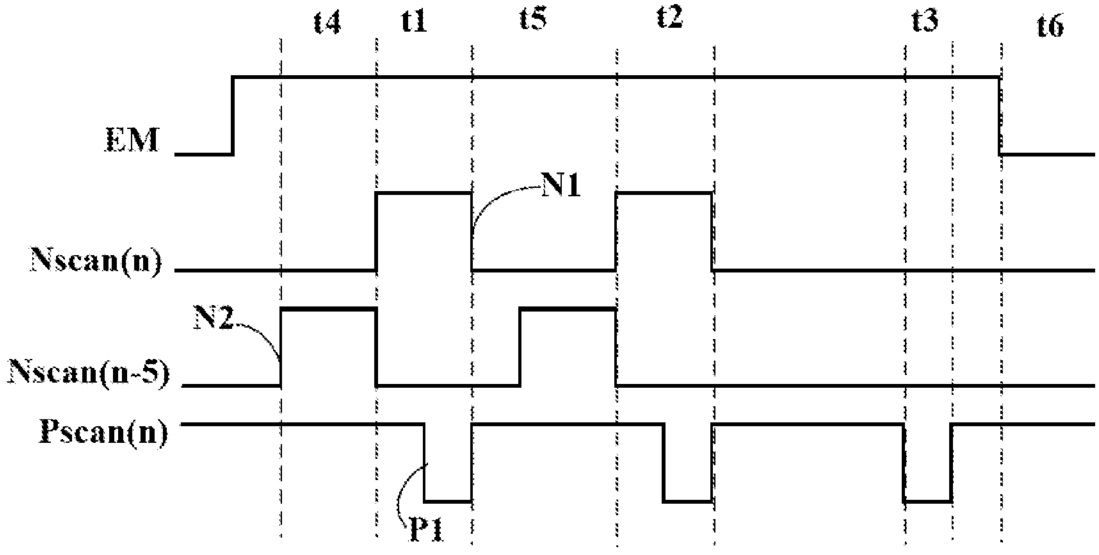
FIG. 2 is a first signal timing diagram of a writing frame of the pixel driving circuit shown in FIG. 1.

Referring to FIGS. 1 and 2, FIG. 1 is a schematic diagram showing a circuit structure of a pixel driving circuit according to some embodiments of the present application, and FIG. 2 is a first signal timing diagram of a writing frame of the pixel driving circuit shown in FIG. 1. In some embodiments of the present application, the pixel driving circuit 100 may include a driving transistor TD and a data writing module 101.

A first electrode of the driving transistor TD may be electrically connected to a first node A. A second electrode of the driving transistor TD may be electrically connected to a second node B. A gate of the driving transistor TD may be electrically connected to a third node Q.

The first electrode may be one of a source or a drain of the driving transistor TD, and the second electrode may be another one of the source or the drain of the driving transistor TD.

A first control terminal of the data writing module 101 may be connected to a first control signal Pscan(n). A second control terminal of the data writing module 101 may be connected to a second control signal Nscan(n). An input terminal of the data writing module 101 may be connected to a data voltage Data. The data writing module 101 may be also electrically connected to the first node A, the second node B, and the third node Q. That is, the data writing module 101 may be also electrically connected to the gate, the first electrode, and the second electrode of the driving transistor TD.

A driving timing of the pixel driving circuit 100 may include a writing frame. The writing frame may include a first data writing phase t1 and a second data writing phase t2 in sequence. The data voltage Data may include an active data voltage and a first data compensation voltage. The data writing module 101 may be configured to first write the first data compensation voltage into the gate, the first electrode, and the second electrode of the driving transistor TD in the first data writing phase t1, and then write the active data voltage into the gate, the first electrode, and the second electrode of the driving transistor TD in the second data writing phase t2.

Generally, the driving timing of the pixel driving circuit 100 may further include a writing frame and a holding frame. The writing frame may include one sub-frame and the holding frame may include at least one sub-frame. It should be understood that the display panel may include a variety of display frequencies, such as 30 Hz, 60 Hz, 120 Hz, etc. When the display panel is displayed with 120 Hz as a reference, the driving timing of the pixel driving circuit 100 may include only a writing frame, where the writing frame includes one sub-frame. When the display panel is displayed with 30 Hz, the driving timing of the pixel driving circuit 100 may include a writing frame and a holding frame. The writing frame may include one sub-frame and the holding frame may include three sub-frames. That is, the display panel is displayed with 120 Hz, which is a high frequency display, and one frame of the displayed picture includes one sub-frame. When the display panel is displayed with 30 Hz, which is a low frequency display, and one frame of the displayed picture includes three sub-frames.

In this regard, the applicant has found that the electric property of the driving transistor TD is shifted after switching of the display frequency of the display panel, which causes the electric property of the driving transistor TD to be inconsistent between the writing frame and the holding frame, and finally causes the display brightness to be different and the color to be deviated. Therefore, the embodiments of the present application set the first data writing phase t1 and the second data writing phase t2 in the writing frame, can reset the driving transistor TD by writing the first data compensation voltage in advance before writing of the active data voltage, thereby shielding the influence of the electric property of the driving transistor in the previous frame of display on the current frame of display and improving change in both the brightness and the color due to switching of the display frequency.

In the embodiments of the present application, the voltage value of the first data compensation voltage and the voltage value of the active data voltage may be equal or unequal to each other.

It should be understood that a plurality of pixel units may be arranged in an array in a display panel. Each of the pixel units may include a pixel driving circuit 100. The first data compensation voltage in the pixel driving circuit 100 corresponding to the mth row of pixel units is the active data voltage in the pixel driving circuit 100 corresponding to the kth row of pixel units, where m and k are both positive integers, and m is greater than k. For example, the first data compensation voltage in the pixel driving circuit 100 in the tenth row of pixel units may be the active data voltage in the pixel driving circuit 100 of the ninth row of pixel units.

In some embodiments of the present application, the driving timing of the pixel driving circuit 100 may further include a third data writing phase t3 after the second data writing phase t2. The data voltage Data may further include a second data compensation voltage. The data writing module 101 may be configured to write the second data compensation voltage into the first electrode and the second electrode of the driving transistor TD in the third data writing phase t3.

It should be understood that the second data compensation voltage is written into the first electrode and the second electrode of the driving transistor TD in the third data writing phase t3, so that an additional bias voltage can be applied to the driving transistor TD, thereby further correcting the electrical difference of the driving transistor TD. Meanwhile, the pixel driving circuit 100 can reset potentials of the first electrode and the second electrode of the driving transistor TD to the same value under the driving of different active display data, thereby reducing the influence on the characteristics of the driving transistor DT.

Similarly, the voltage value of the second data compensation voltage and the voltage value of the active data voltage may be equal or unequal to each other, which is not repeatedly described herein.

In some embodiments of the present application, in the writing frame, the first control signal Pscan(n) may include three first pulses P1. The second control signal Nscan(n) may include two second pulses N1.

In the driving timing of the pixel driving circuit 100, the first one of the first pulses P1 and the first one of the second pulses N1 are located in the first data writing phase t1, and at least partially overlapped with each other. The second one of the first pulses P1 and the second one of the second pulses N1 are located in the second data writing phase t2 and at least partially overlapped with each other. The third one of the first pulses P1 is located in the third data writing phase t3 and occurs after the second one of the second pulses N1.

Specifically, a pulse width of the first pulse P1 may be greater than that of the second pulse N1. For example, as shown in FIG. 2, in the first data writing phase t1, a rising edge of the first pulse P1 is earlier than that of the second pulse N1. A falling edge of the first pulse P1 is at the same time as that of the second pulse N1. Ideally, both the first control signal Pscan(n) and the second control signal Nscan (n) are pulse signals with the pulse width and the duty cycle being constant.

It should be understood that the first control terminal of the data writing module 101 may be connected to the first control signal Pscan(n) and the second control terminal of the data writing module 101 may be connected to the second control signal Nscan(n). That is, the data writing module 101 may be controlled by the first control signal Pscan(n) and the second control signal Nscan(n). By enabling the first pulse P1 of the first control signal Pscan(n) to at least partially overlap the second pulse N1 of the second control signal Nscan(n) in the first data writing phase t1 (and/or the second data writing phase t2), the data writing module 101 can write the first data compensation voltage and the active data voltage into the gate of the driving transistor, respectively, under the control of the first pulse P1 and the second pulse N1.

In some embodiments of the present application, the pixel driving circuit 100 may further include a first initialization module 102. A control terminal of the first initialization module 102 may be connected to a third control signal Nscan(n-5). An input terminal of the first initialization module 102 may be connected to a first initialization signal Vi1, and an output terminal of the first initialization module 102 may be electrically connected to the gate of the driving transistor TD.

When the pixel driving circuit 100 includes the first initialization module 102, the driving timing of the pixel driving circuit 100 may include a first initialization phase t4, the first data writing phase t1, a second initialization phase t5, and the second data writing phase t2 in sequence. The first initialization module 102 is configured to write the first initialization signal Vi1 into the gate of the driving transistor TD in the first initialization phase t4 and the second initialization phase t5, respectively.

By setting the first initialization phase t4 before the first data writing phase t1 in the embodiments of the present application, the gate of the driving transistor TD may be reset, so that the influence of gate potential of the driving transistor in the previous frame of display on the current frame of display can be reduced. Further, by setting the second initialization phase t5 after the first data writing phase t1, the gate of the driving transistor TD may be reset again, so that the influence of the pre-written first data compensation voltage on the current frame of display can be avoided.

In some embodiments of the present application, the second control signal Nscan(n) and the third control signal Nscan(n-5) may be generated by the same GOA circuit. The second control signal Nscan(n) is the nth stage of scan signal output by the GOA circuit, and the third control signal Nscan(n-5) is the (n-5)-th scan signal output by the GOA circuit.

The GOA circuit is to integrate the gate driving circuit on the array substrate of the display panel to realize the driving mode of progressive scanning, so that the gate driving circuit can be omitted, and the GOA circuit has advantages of reducing the production cost and realizing the design of a narrow frame of the panel, and is used for various displays. In the embodiments of the present application, the second control signal Nscan(n) and the third control signal Nscan (n-5) are generated by the same GOA circuit, so that complexity of the circuit and the signals can be reduced.

In the embodiments of the present application, the driving timing of the pixel driving circuit 100 may further include a holding frame (not shown) after a writing frame. In the holding frame, the data writing module 101 may be configured to write the data voltage Data into the first electrode and the second electrode of the driving transistor TD at least once under the control of the first control signal Pscan(n), and further reset the characteristic of the driving transistor TD.

As shown in FIG. 2, in some embodiments of the present application, the pixel driving circuit 100 may further include a first light emitting control module 103, a second light emitting control module 104, a second initialization module 105, a first capacitor C1, a second capacitor C2, and a light emitting device D.

The first light emitting control module 103 includes, but is not limited to, a fourth transistor T4. A gate of the fourth transistor T4 may be connected to an enable signal EM. One of a source or a drain of the fourth transistor T4 may be connected to a first power supply signal VDD. Another one of the source or the drain of the fourth transistor T4 may be electrically connected to a first node A.

The second light emitting control module 104 includes, but is not limited to, a fifth transistor T5. A gate of the fifth transistor T5 may be connected to the enable signal EM. One of a source or a drain of the fifth transistor T5 may be electrically connected to a second node B. Another one of the source or the drain of the fifth transistor T5 may be electrically connected to a fourth node C.

One electrode plate of the first capacitor C1 may be electrically connected to a third node Q. Another electrode plate of the first capacitor C1 may be connected to the first power supply signal VDD. One terminal of the light emitting device D may be electrically connected to the fourth node C. Another terminal of the light emitting device D may be connected to a second power supply signal VSS. One electrode plate of the second capacitor C2 may be electrically connected to the third node Q. Another electrode plate of the second capacitor C2 may be connected to the first control signal Pcan(n).

The voltage of the first power supply signal VDD may be greater than that of the second power supply signal VSS. The light emitting device D may be an Mini light emitting diode, an Micro light emitting diode, or an organic light emitting diode, which is not specifically limited in the present application.

The first initialization module 102 includes, but is not limited to, a third transistor T3. A gate of the third transistor T3 may be connected to the third control signal Nscan(n-5). One of a source or a drain of the third transistor T3 may be connected to the first initialization signal Vi1. Another one of the source or the drain of the third transistor T3 may be electrically connected to the third node Q.

The second initialization module 105 includes, but is not limited to, a sixth transistor T6. A gate of the sixth transistor T6 may be connected to the fourth control signal Pscan(n-1). One of a source or a drain of the sixth transistor T6 may be connected to the second initialization signal Vi2. Another one of the source or the drain of the fifth transistor T6 may be electrically connected to the fourth node C.

The data writing module 101 includes, but is not limited to, a first transistor T1 and a second transistor T2. A gate of the first transistor T1 may be connected to the first control signal Pscan(n). One of a source or a drain of the first transistor T1 may be connected to the data voltage Data. Another one of the source or drain of the first transistor T1 may be electrically connected to the first node A. A gate of the second transistor T2 may be connected to the second control signal Nscan(n). One of a source or a drain of the second transistor T2 may be electrically connected to the second node B. Another one of the source or the drain of the second transistor T2 may be electrically connected to the third node Q.

It should be noted that the transistors used in all embodiments of the present application may be thin film transistors, field effect transistors, or other devices with same characteristics. Since a source and a drain of the transistor used herein are symmetrical, the source and drain of the transistor may be interchanged. In an embodiment of the present application, to distinguish between two electrodes of a transistor except the gate, one of the two electrodes is referred to as a source, and another of the two electrodes is referred to as a drain. It is provided as shown in drawings that a middle terminal of a switching transistor represents a gate, a signal input terminal thereof represents a drain, and an output terminal thereof is a source. In addition, the transistors used in the embodiments of present application may include a P-type transistor and/or an N-type transistor. The P-type transistor is turned on when a gate of the P-type transistor is at a low level, and is turned off when the gate thereof is at a high level. The N-type transistor is turned on when a gate of the N-type transistor is at a high level, and is turned off when the gate thereof is at a low level.

Further, in order to improve the performance of the pixel driving circuit 100, the transistors provided in the embodiments of the present application may be low temperature polysilicon thin film transistors and/or oxide semiconductor thin film transistors, where the oxide semiconductor thin film transistors may be oxide thin film transistors, such as indium gallium zinc oxide thin film transistors. In the embodiments of the present application, both types of thin film transistors described above may be applied to the same pixel driving circuit 100 so that the oxide thin film transistor may be used as a device where a leakage current is larger in the pixel driving circuit 100, so as to effectively prevent charge leakage at the gate of the corresponding driving transistor TD during driving of the low frequency, and further prevent the displayed picture from flashing.

Specifically, the following embodiments of the present application are described with reference to examples in which the first transistor T1, the driving transistor TD, the fourth transistor T4, the fifth transistor T5, and the sixth transistor T6 in the pixel driving circuit 100 are P-type low-temperature polycrystalline silicon transistors, and the second transistor T2 and the third transistor T3 are N-type oxide transistors, but are not to be construed as limitation to the present application.

As shown in FIGS. 1 and 2, the driving timing of the pixel driving circuit 100 may include the first initialization phase t4, the first data writing phase t1, the second initialization phase t5, the second data writing phase t2, a third data writing phase t3, and a light emitting phase t6 in sequence.

In the first initialization phase t4, the first control signal Pscan(n), the third control signal Nscan(n-5), and the enable signal EM are all at high levels, and the second control signal Nscan(n) is at a low level. The third transistor T3 is turned on and the remaining of the transistors are turned off. The first initialization signal Vi1 is written into the gate of the driving transistor TD via the third transistor T3.

Additionally, the fourth control signal Pscan(n-1) and the first control signal Pscan(n) may be generated by the same GOA circuit. In the first initialization phase t4, the fourth control signal Pscan (n-1) is at a low level to enable the sixth transistor T6 to be turned on, and the second initialization signal Vi2 is written to the fourth node C via the sixth transistor T6, that is, an anode of the light emitting device D is reset.

In the first data writing phase t1, the first control signal Pscan(n) is first held at a high level and then switched to a low level, and the third control signal Nscan(n-5) is at a low level. The enable signal EM and the second control signal Nscan(n) are both at high levels. The first transistor T1, the second transistor T2, and the driving transistor TD are turned on, and the remaining of the transistors are turned off. The first data compensation voltage is written into the first electrode, the second electrode, and the gate of the driving transistor TD via the first transistor T1, the driving transistor TD, and the second transistor T2.

In the second initialization phase t5, the first control signal Pscan(n) and the enable signal EM are both at high levels, the third control signal Nscan(n-5) is first held at a low level and then switched to a high level, and the second control signal Nscan(n) is at a low level. The third transistor T3 is turned on and the remaining of the transistors are turned off. The first initialization signal Vi1 is written into the gate of the driving transistor TD via the third transistor T3.

Similarly, in the second initialization phase t5, the fourth control signal Pscan (n-1) is at a low level to enable the sixth transistor T6 to be turned on, and the second initialization signal Vi2 is written to the fourth node C via the sixth transistor T6, that is, an anode of the light emitting device D is reset.

In the second data writing phase t2, the first control signal Pscan(n) is first held at a high level and then switched to a low level, and the third control signal Nscan(n-5) is at a low level. The enable signal EM and the second control signal Nscan(n) are both at high levels. The first transistor T1, the second transistor T2, and the driving transistor TD are turned on, and the remaining of the transistors are turned off. The first data compensation voltage is written into the first electrode, the second electrode, and the gate of the driving transistor TD via the first transistor T1, the driving transistor TD, and the second transistor T2.

In the third data writing phase t3, the first control signal Pscan(n) and the enable signal EM are both at high levels, and the third control signal Nscan(n-5) is first held at a low level and then switched to a high level. The second control signal Nscan(n) is at a low level. The third transistor T3 is turned on and the remaining of the transistors are turned off. The first initialization signal Vi1 is written into the gate of the driving transistor TD via the third transistor T3.

In the light emitting phase t6, the enable signal EM, the second control signal Nscan(n), and the third control signal Nscan(n-5) are all at low levels, and the first control signal Pscan(n) is at a high level. The fourth transistor T4 and the fifth transistor T5 are turned on, so that the light emitting device D emits light.

Figure 3:
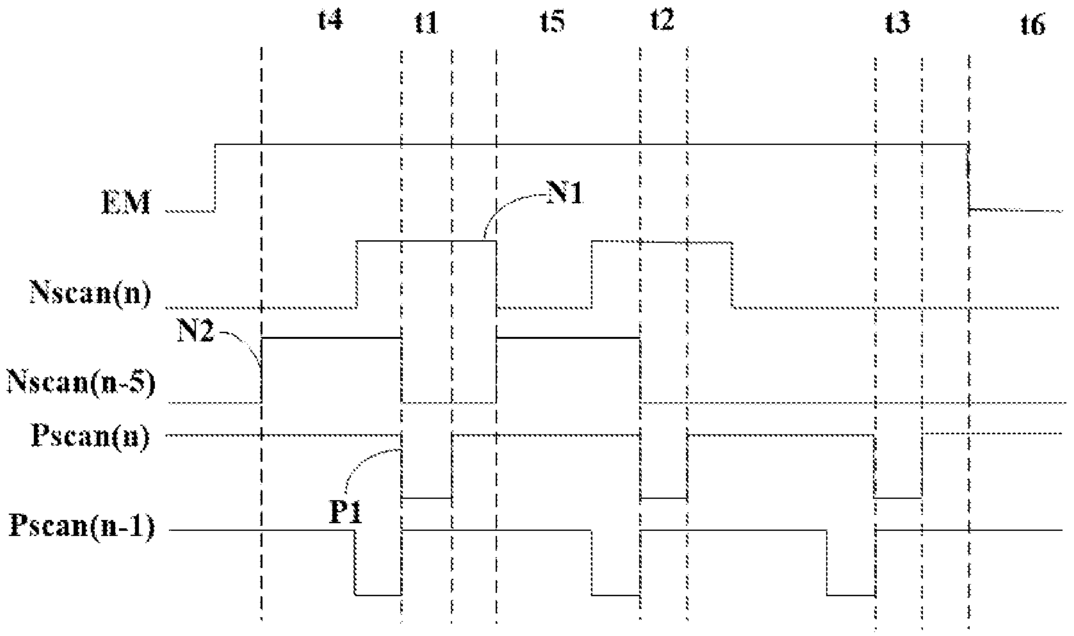
FIG. 3 is a second signal timing diagram of a writing frame of the pixel driving circuit shown in FIG. 1.

Please refer to FIGS. 1 and 3, FIG. 3 is a second signal timing diagram of a writing frame of the pixel driving circuit shown in FIG. 1. The difference from the first signal timing diagram shown in FIG. 2 is that, in some embodiments of the present application, the first initialization module 102 is further configured to write the first initialization signal Vi1 into the second electrode of the driving transistor TD in the first initialization phase t4 and/or the second initialization phase t5.

The first control signal Pscan(n) may include one or more first pulses P1. The second control signal Nscan(n) may include one or more second pulses N1. The third control signal Nscan(n-5) may include one or more third pulses N2. In the first initialization phase t4 and/or the second initialization phase t5, the first pulses P1 may at least partially overlap the second pulses N1. The third pulses N2 may be interleaved with the first pulses P1.

By adjusting waveforms of the first control signal Pscan (n), the second control signal Nscan(n), and the third control signal Nscan(n-5) in the embodiments of the present application, the first initialization signal Vi1 may be written into the second electrode (that is, the second node B) of the driving transistor TD in the first initialization phase t4 and/or the second initialization phase t5. As a result, the potential of the second electrode of the driving transistor TD is lowered to the potential of the gate. In this case, the gate-drain voltage Vgd of the driving transistor TD is equal to zero, i.e., Vgd=0, thereby further correcting the characteristic of the driving transistor TD.

Specifically, the second signal timing diagram shown in FIG. 3 differs from the first signal timing diagram shown in FIG. 2 in that the first control signal Pscan(n), the third control signal Nscan(n-5), and the enable signal EM are all at high levels in the first initialization phase t4 and the second initialization phase t5. The second control signal Nscan(n) is first at a low level and then switched from a low level to a high level. As a result, the third transistor T3 is first turned on, and the remaining transistors are turned off, so that the first initialization signal Vi1 is written into the gate (that is, the third node Q) of the driving transistor TD via the third transistor T3. Then, the second transistor T2 is turned on, and the first initialization signal Vi1 is written into the second electrode of the driving transistor TD via the second transistor T2.

Figure 4:
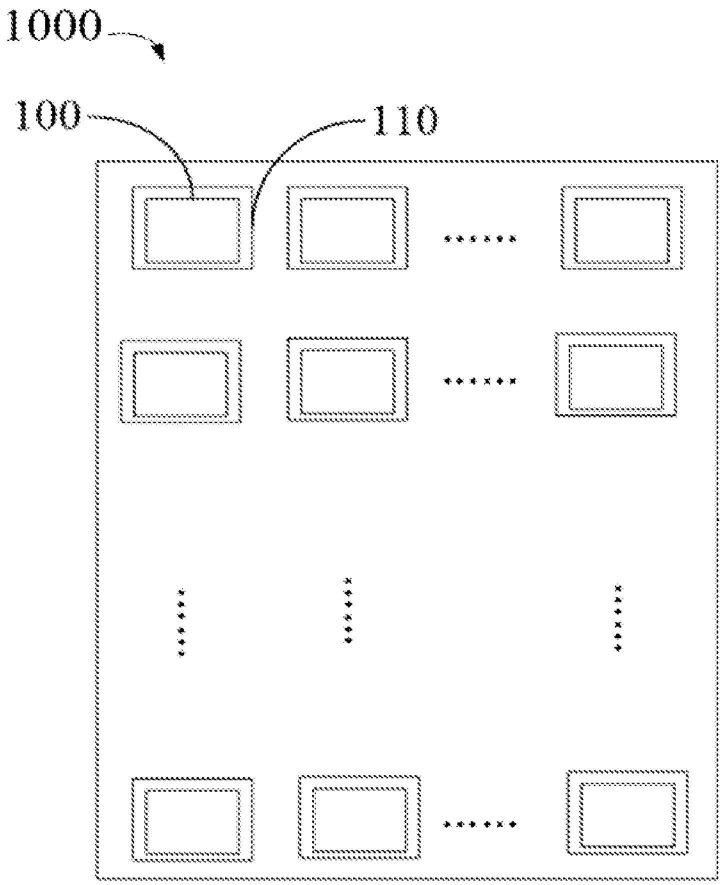
FIG. 4 is a schematic structural diagram of a display panel according to some embodiments of the present application.

Please refer to FIG. 4, which is a first structural diagram of a display panel according to an embodiment of the present application. Another embodiment of the present application provides a display panel 1000, including a plurality of pixel units 110 arranged in an array. Each of the pixel units 110 includes the pixel driving circuit 100 described in any one of the above embodiments, which can refer to the above related description and be not repeated described herein.

In the embodiments of the present application, the display panel 1000 may be an Organic Light Emitting Diode (OLED) display panel, an Mini Light Emitting Diode (Mini LED) display panel, an Micro Light Emitting Diode (Micro LED) display panel, or the like.

Figure 5:
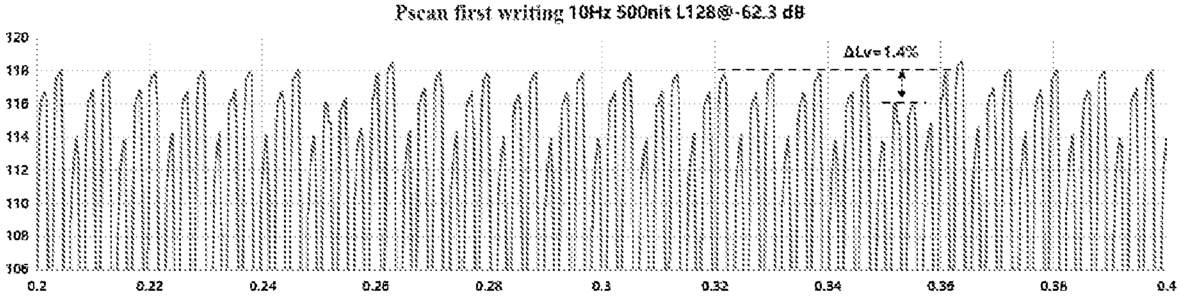
FIG. 5 is a flicker test diagram of a display panel in the related art.
Figure 6:
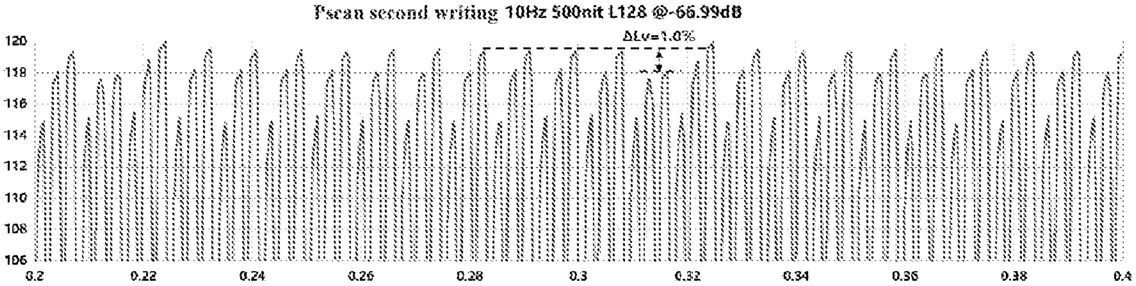
FIG. 6 is a flicker test diagram of a display panel according to some embodiments of the present application.

Please refer to FIGS. 5 and 6, FIG. 5 is a flicker test diagram of a display panel in the related art. FIG. 6 is a flicker test diagram of a display panel according to some embodiments of the present application. An example in which the display frequency is 10 Hz, the luminous intensity is 500 nit, and the gray scale is L128 may be tested in the embodiments of the present application. It can be seen in the embodiments of the present application that the first data compensation voltage is pre-written before writing of the active data voltage, which can reduce the luminance difference between the writing frame and the holding frame, and the flicker value can be optimized.

Yet other embodiment of the present application further provides a display panel 1000, wherein each of pixel units 110 includes the pixel driving circuit 100 according to any one of the above embodiments. In the driving timing of the pixel driving circuit 100, the driving transistor can be reset by writing the first data compensation voltage in advance before writing of the active data voltage, thereby shielding the influence of the electric property of the driving transistor in the previous frame of display on the current frame of display, improving change in both the brightness and the color due to switching of the display frequency, and improving the displayed picture quality of the display panel 1000.

The pixel driving circuit and the display panel provided in the embodiments of the present application are described in detail above. A specific example is used herein to describe a principle and an implementation of the present application. The description of the foregoing embodiments is merely used to help understand a method and a core idea of the present application. In addition, an ordinary person skilled in the art may make changes in a specific implementation manner and an application scope according to an idea of the present application. In conclusion, content of this specification should not be construed as a limitation on the present application.

What is claimed is:

1. A pixel driving circuit, comprising a driving transistor and a data writing module, wherein, a first control terminal of the data writing module is connected to a first control signal, a second control terminal of the data writing module is connected to a second control signal, an input terminal of the data writing module is connected to a data voltage, and the data writing module is further electrically connected to a gate, a first electrode and a second electrode of the driving transistor;

a driving timing of the pixel driving circuit includes a writing frame including a first data writing phase and a second data writing phase in sequence, and the data voltage includes an active data voltage and a first data compensation voltage; and the data writing module is configured to write the first data compensation voltage into the gate, the first electrode, and the second electrode of the driving transistor in the first data writing phase, and to write the active data voltage into the gate, the first electrode, and the second electrode of the driving transistor in the second data writing phase;

wherein the driving timing of the pixel driving circuit further includes a third data writing phase after the second data writing phase;

wherein, in the writing frame, the first control signal includes three first pulses and the second control signal includes two second pulses; and in the driving timing of the pixel driving circuit, first one of the first pulses and first one of the second pulses are located in the first data writing phase and at least partially overlapped with each other, second one of the first pulses and second one of the second pulses are located in the second data writing phase and at least partially overlapped with each other, and third one of the first pulses is located in the third data writing phase.

2. The pixel driving circuit of claim 1, wherein the data voltage further includes a second data compensation voltage; and the data writing module is configured to write the second data compensation voltage into the first electrode and the second electrode of the driving transistor in the third data writing phase.

3. The pixel driving circuit of claim 1, further comprising: a first initialization module, wherein a control terminal of the first initialization module is connected to a third control signal, an input terminal of the first initialization module is connected to a first initialization signal, and an output terminal of the first initialization module is electrically connected to the gate of the driving transistor;

wherein the driving timing of the pixel driving circuit includes a first initialization phase, the first data writing phase, a second initialization phase, and the second data writing phase in sequence; and the first initialization module is configured to write the first initialization signal into the gate of the driving transistor in the first initialization phase and the second initialization phase, respectively.

4. The pixel driving circuit of claim 3, wherein the first initialization module is further configured to write the first initialization signal into the second electrode of the driving transistor in the first initialization phase and/or the second initialization phase.

5. The pixel driving circuit of claim 4, wherein, the first control signal includes a first pulse, the second control signal includes a second pulse, and the third control signal includes a third pulse; and in the first initialization phase and/or the second initialization phase, the first pulse at least partially overlaps the second pulse, and the third pulse is interleaved with the first pulse.

6. The pixel driving circuit of claim 3, wherein the second control signal and the third control signal are generated by the same gate driver on array (GOA) circuit, the second control signal is an nth stage of scan signal output by the GOA circuit, and the third control signal is an (n-5)-th stage of scan signal output by the GOA circuit.

7. The pixel driving circuit of claim 1, wherein, the driving timing of the pixel driving circuit further includes a holding frame after the writing frame; and the data writing module is further configured to write the data voltage into the first electrode and the second electrode of the driving transistor at least once in the holding frame.

8. The pixel driving circuit of claim 2, wherein, the driving timing of the pixel driving circuit further includes a holding frame after the writing frame; and the data writing module is further configured to write the data voltage into the first electrode and the second electrode of the driving transistor at least once in the holding frame.

9. The pixel driving circuit of claim 1, wherein, the driving timing of the pixel driving circuit further includes a holding frame after the writing frame; and the data writing module is further configured to write the data voltage into the first electrode and the second electrode of the driving transistor at least once in the holding frame.

10. A display panel, comprising a plurality of pixel units arranged in an array, wherein each of the pixel units includes a pixel driving circuit comprising: a driving transistor and a data writing module, wherein, a first control terminal of the data writing module is connected to a first control signal, a second control terminal of the data writing module is connected to a second control signal, an input terminal of the data writing module is connected to a data voltage, and the data writing module is further electrically connected to a gate, a first electrode and a second electrode of the driving transistor;

a driving timing of the pixel driving circuit includes a writing frame including a first data writing phase and a second data writing phase in sequence, and the data voltage includes an active data voltage and a first data compensation voltage; and the data writing module is configured to write the first data compensation voltage into the gate, the first electrode, and the second electrode of the driving transistor in the first data writing phase, and to write the active data voltage into the gate, the first electrode, and the second electrode of the driving transistor in the second data writing phase;

wherein the driving timing of the pixel driving circuit further includes a third data writing phase after the second data writing phase;

wherein, in the writing frame, the first control signal includes three first pulses and the second control signal includes two second pulses; and in the driving timing of the pixel driving circuit, first one of the first pulses and first one of the second pulses are located in the first data writing phase and at least partially overlapped with each other, second one of the first pulses and second one of the second pulses are located in the second data writing phase and at least partially overlapped with each other, and third one of the first pulses is located in the third data writing phase.

11. The display panel of claim 10, wherein the data voltage further includes a second data compensation voltage; and the data writing module is configured to write the second data compensation voltage into the first electrode and the second electrode of the driving transistor in the third data writing phase.

12. The display panel of claim 10, wherein the pixel driving circuit further includes: a first initialization module, wherein a control terminal of the first initialization module is connected to a third control signal, an input terminal of the first initialization module is connected to a first initialization signal, and an output terminal of the first initialization module is electrically connected to the gate of the driving transistor;

the driving timing of the pixel driving circuit includes a first initialization phase, the first data writing phase, a second initialization phase, and the second data writing phase in sequence; and the first initialization module is configured to write the first initialization signal into the gate of the driving transistor in the first initialization phase and the second initialization phase, respectively.

13. The display panel of claim 12, wherein the first initialization module is further configured to write the first initialization signal into the second electrode of the driving transistor in the first initialization phase and/or the second initialization phase.

14. The display panel of claim 13, wherein, the first control signal includes a first pulse, the second control signal includes a second pulse, and the third control signal includes a third pulse; and in the first initialization phase and/or the second initialization phase, the first pulse at least partially overlaps the second pulse, and the third pulse is interleaved with the first pulse.

15. The display panel of claim 12, wherein the second control signal and the third control signal are generated by the same gate driver on array (GOA) circuit, the second control signal is an nth stage of scan signal output by the GOA circuit, and the third control signal is an (n-5)-th stage of scan signal output by the GOA circuit.

16. The display panel of claim 10, wherein, the driving timing of the pixel driving circuit further includes a holding frame after the writing frame; and the data writing module is further configured to write the data voltage into the first electrode and the second electrode of the driving transistor at least once in the holding frame.

17. The display panel of claim 11, wherein, the driving timing of the pixel driving circuit further includes a holding frame after the writing frame; and the data writing module is further configured to write the data voltage into the first electrode and the second electrode of the driving transistor at least once in the holding frame.

18. The display panel of claim 10, wherein, the first data compensation voltage in the pixel driving circuit corresponding to the mth row of pixel units is the active data voltage in the pixel driving circuit corresponding to the kth row of pixel units, wherein m and k are both positive integers, and m is greater than k.

19. A pixel driving circuit, comprising a driving transistor and a data writing module, wherein, a first control terminal of the data writing module is connected to a first control signal, a second control terminal of the data writing module is connected to a second control signal, an input terminal of the data writing module is connected to a data voltage, and the data writing module is further electrically connected to a gate, a first electrode and a second electrode of the driving transistor;

a driving timing of the pixel driving circuit includes a writing frame including a first data writing phase and a second data writing phase in sequence, and the data voltage includes an active data voltage and a first data compensation voltage; and the data writing module is configured to write the first data compensation voltage into the gate, the first electrode, and the second electrode of the driving transistor in the first data writing phase, and to write the active data voltage into the gate, the first electrode, and the second electrode of the driving transistor in the second data writing phase;

wherein the pixel driving circuit further comprises: a first initialization module, wherein a control terminal of the first initialization module is connected to a third control signal, an input terminal of the first initialization module is connected to a first initialization signal, and an output terminal of the first initialization module is electrically connected to the gate of the driving transistor;

wherein the driving timing of the pixel driving circuit includes a first initialization phase, the first data writing phase, a second initialization phase, and the second data writing phase in sequence; and the first initialization module is configured to write the first initialization signal into the gate of the driving transistor in the first initialization phase and the second initialization phase, respectively.

* * * * *